(12) United States Patent
Jackson

(10) Patent No.: US 7,126,299 B2
(45) Date of Patent: Oct. 24, 2006

(54) ENHANCED SYSTEM AND METHOD FOR CONTROLLING DISCHARGE OF ELECTRIC ENERGY FROM MACHINES

(75) Inventor: Robert D. Jackson, Lilburn, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 193 days.

(21) Appl. No.: 10/896,816

(22) Filed: Jul. 22, 2004

(65) Prior Publication Data

US 2005/0040780 A1 Feb. 24, 2005

Related U.S. Application Data

(60) Provisional application No. 60/491,598, filed on Jul. 31, 2003.

(51) Int. Cl.
*H02P 3/12* (2006.01)

(52) U.S. Cl. .................. 318/380; 318/375; 318/161

(58) Field of Classification Search ............ 318/370, 318/246, 801
See application file for complete search history.

(56) References Cited

U.S. PATENT DOCUMENTS

| | | | | |
|---|---|---|---|---|
| 3,881,578 A * | 5/1975 | Dubreucq | ................ | 188/165 |
| 4,222,614 A * | 9/1980 | Spechko | ................ | 303/20 |
| 4,307,300 A * | 12/1981 | Kisami | ................ | 307/9.1 |
| 4,839,754 A * | 6/1989 | Gami et al. | ................ | 360/73.01 |
| 5,190,123 A * | 3/1993 | Hvolka | ................ | 188/71.6 |
| RE34,399 E * | 10/1993 | Gami et al. | ................ | 360/73.01 |
| 5,368,116 A * | 11/1994 | Iijima et al. | ................ | 180/65.4 |
| 5,485,901 A * | 1/1996 | Akima et al. | ................ | 188/164 |
| 5,509,509 A * | 4/1996 | Dammeyer et al. | ................ | 188/164 |
| 5,629,596 A * | 5/1997 | Iijima et al. | ................ | 318/762 |
| 5,705,903 A * | 1/1998 | Hastings | ................ | 318/370 |
| 5,747,959 A * | 5/1998 | Iijima et al. | ................ | 318/762 |
| 6,236,173 B1 * | 5/2001 | Meyer | ................ | 318/246 |
| 6,430,045 B1 * | 8/2002 | Everitt | ................ | 361/690 |
| 6,499,565 B1 * | 12/2002 | Coyle et al. | ................ | 184/6.12 |
| 6,749,043 B1 * | 6/2004 | Brown et al. | ................ | 188/3 R |
| 6,871,726 B1 * | 3/2005 | Coyle et al. | ................ | 184/6.22 |
| 6,907,958 B1 * | 6/2005 | Coyle et al. | ................ | 184/6.12 |
| 7,007,779 B1 * | 3/2006 | Johansson et al. | ................ | 188/161 |
| 2001/0043049 A1 * | 11/2001 | Cochoy et al. | ................ | 318/801 |
| 2003/0062223 A1 * | 4/2003 | Coyle et al. | ................ | 184/6.12 |
| 2003/0075396 A1 * | 4/2003 | Brown et al. | ................ | 188/71.6 |
| 2004/0149518 A1 * | 8/2004 | Coyle et al. | ................ | 184/6.22 |
| 2004/0150262 A1 * | 8/2004 | Gronau et al. | ................ | 303/191 |
| 2004/0238283 A1 * | 12/2004 | Coyle et al. | ................ | 184/6.22 |
| 2005/0156752 A1 * | 7/2005 | Finkenzeller et al. | ................ | 340/693.3 |
| 2006/0005736 A1 * | 1/2006 | Kumar | ................ | 105/1.4 |

FOREIGN PATENT DOCUMENTS

DE 19828754 A1 * 12/1999
DE 19828755 A1 * 12/1999

* cited by examiner

Primary Examiner—Paul Ip

(57) ABSTRACT

Certain exemplary embodiments can comprise a method comprising: receiving electrical energy from a braking system of a vehicle at a working coil, the vehicle comprising a first wheel drive comprising a first electric motor; and via the working coil, transferring the electrical energy to a mass related to the vehicle via Hall Effect, the transferred electrical energy converted to heat energy in the mass.

20 Claims, 8 Drawing Sheets

ENHANCED SYSTEM AND METHOD FOR
CONTROLLING DISCHARGE OF ELECTRIC
ENERGY FROM MACHINES

CROSS-REFERENCE TO RELATED APPLICATION

This application claims priority to, and incorporates by reference herein in its entirety, pending U.S. Provisional Patent Application Ser. No. 60/491,598, filed 31 Jul. 2003.

BACKGROUND

U.S. Pat. No. 2,633,541 (Justus), which is incorporated by reference herein in its entirety, allegedly cites "a novel method of dissipating the heat created in resistors for absorbing the electrical energy generated in dynamic braking, which method avoids the objections to the prior methods described above. One object of my invention is to provide a system for dissipating the heat created by conversion of the electrical energy generated in dynamic braking to heat energy in apparatus which is relatively compact and light in weight. Another object is to provide a system and method for dissipating the electrical energy created in dynamic braking which comprises converting the electrical energy into heat and transferring the heat to the liquid in the cooling circuit of an internal combustion engine. A further object is to provide a system for dissipating the energy created in dynamic braking as heat added to the cooling fluid of an unloaded internal combustion engine, thereby maintaining the engine at an elevated temperature. Still another object of my invention is to provide a system for dissipating the energy created in dynamic braking as heat added to the cooling fluid of an internal combustion engine which system includes, for cooling said fluid, a fan whose speed is automatically varied with the amount of energy to be dissipated. A still further object of my invention is to provide a system for dissipating the energy created in dynamic braking as heat added to the cooling fluid of an internal combustion engine, which system includes means for circulating said fluid in proportion to the amount of energy to be dissipated." See column 1, line 37 through column 2, line 9.

U.S. Pat. No. 4,173,732 (Anderson), which is incorporated by reference herein in its entirety, allegedly cites the "heat energy dissipation capacity of the provided dynamic braking resistors for a given transit vehicle is established and then the generated motor current supplied to those resistors by the regenerating propulsion motor of the vehicle during the brake mode of operation is controlled to limit as desired in accordance with that capacity the total energy dissipated by the dynamic braking resistors." See Abstract.

SUMMARY

Certain exemplary embodiments can comprise a method comprising: receiving electrical energy from a braking system of a vehicle at a working coil, the vehicle comprising a first wheel drive comprising a first electric motor; and via the working coil, transferring the electrical energy to a mass related to the vehicle via Hall Effect, the transferred electrical energy converted to heat energy in the mass.

BRIEF DESCRIPTION OF THE DRAWINGS

A wide variety of potential embodiments will be more readily understood through the following detailed description, with reference to the accompanying drawings in which.

DEFINITIONS

Figure 1:
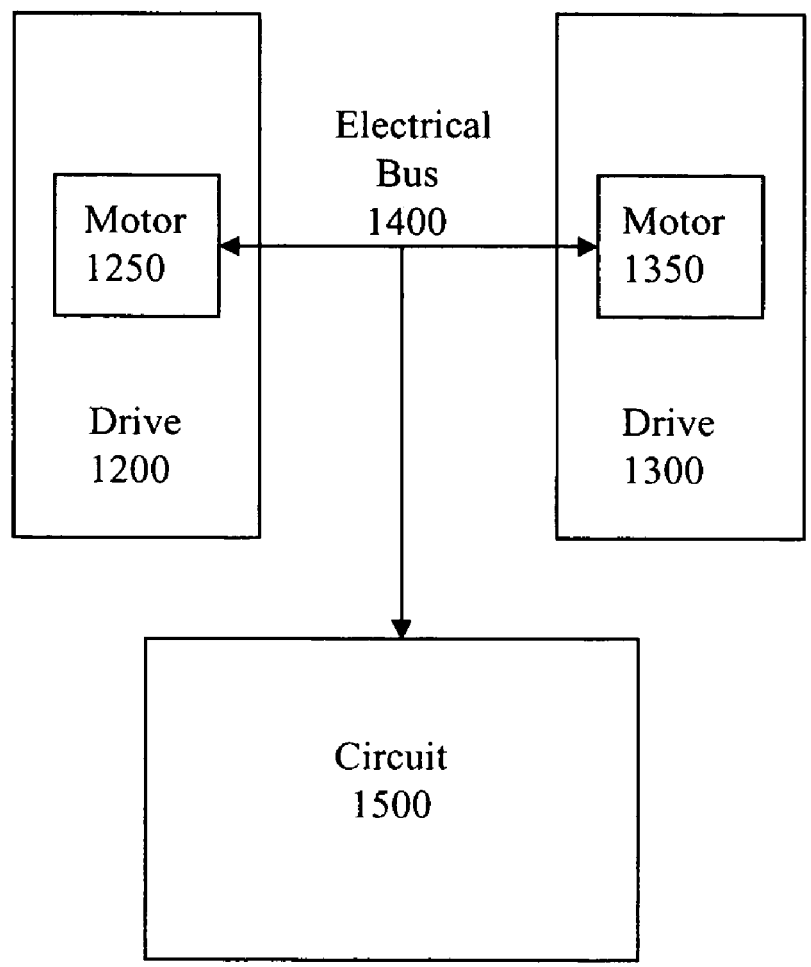
FIG. 1 is a block diagram of an energy management system 1000.

When the following terms are used herein, the accompanying definitions apply:

alternating current (AC)—an electric current that reverses direction in a circuit at regular intervals.

bed—a part of a truck, trailer, or freight car designed to carry loads.

braking system—a plurality of components adapted to retard vehicular motion.

capacitor—a passive electronic component that holds a charge in the form of an electrostatic field.

charging inductor—an inductor adapted to retard and/or smooth transitions in electrical voltage and/or current.

convective—characterized by a circulation of currents from one region to another in a fluid.

direct current—a non-alternating electric current.

dissipate—to cause to lose irreversibly. For example, transferring energy to a surrounding environment dissipates that energy.

electrical bus—an electrical conductor that can make a common connection between a plurality circuits.

electrically coupled—connected in a manner adapted to transfer electrical energy.

electrical energy—energy characterized by the flow of electric charge through a conductor.

electrical motor—a motion-imparting device powered by electricity.

electrical induction motor—a type of alternating-current motor typically comprising at least two members, one stationary, called the stator, and the other rotating, called the rotor.

fan—a machine adapted to move air, typically via rotating vanes.

Hall Effect—a generation of an electric potential perpendicular to both an electric current flowing along a conducting material and an external magnetic field applied at right angles to the current.

heat energy—energy associated with the motion of atoms or molecules and capable of being transmitted through solid and fluid media by conduction, through fluid media by convection, and through an empty space and/or fluid by radiation.

heat exchange apparatus—a device adapted to enhance transfer of heat energy.

inductor—an electrical component that generates a magnetic field when a current is passed through it and stores at least a portion of the electrical energy of the current in the form of the magnetic field. An inductor typically is a loop or coil of wire.

locomotive—a self-propelled vehicle, usually electric or diesel-powered, for pulling or pushing freight or passenger cars on railroad tracks.

magnetically slowing—retarding motion of an electrical motor via application of a magnetic field to the motor.

mass—a solid body.

mine haul truck—a truck adapted to haul ore extracted from the earth.

parallel—an arrangement of components in an electrical circuit that splits an electrical current into two or more paths.

pulsed current—a cylical and/or modulated flow of electrical energy.

pulsed electrical waveforms—a voltage profile over time.

pulse generator—an electric circuit adapted to cycle and/or modulate direct current electricity.

rectifying—converting an alternating current to a direct current.

series—an arrangement of components in an electrical circuit one after the other so that the electrical current is not split therebetween.

time series—a set of values of a variable occurring at successive times.

truck—a motor vehicle designed for carrying or pulling a load.

tuned circuit—an electrically conducting pathway containing both inductance and capacitance elements.

vehicle—a device or structure for transporting persons or things. A vehicle can be an automobile, a truck, a mine haul truck, a tractor, and/or a locomotive, etc.

Voltage pulses—time varying voltage levels in an electrical circuit.

wheel—a solid disk or a rigid circular ring connected by spokes to a hub and designed to turn around an axle passed through the center.

wheel drive—a system adapted to propel a wheel.

working coil—an inductor adapted to transfer energy via the Hall Effect.

DETAILED DESCRIPTION

FIG. 1 is a block diagram of an exemplary embodiment of an energy management system 1000 of a machine. The machine can be, for example, a vehicle, such as an automobile, a pick-up truck, a tandem wheel truck, a locomotive, and/or a mine haul truck, etc. The machine can be a transport, an elevator, an industrial machine, etc.

Energy management system 1000 can comprise a first wheel drive 1200 and a second wheel drive 1300. In certain exemplary embodiments, first wheel drive 1200 can comprise a first motor 1250. Second wheel drive 1300 can comprise a second motor 1350. In certain exemplary embodiments, first wheel drive 1200 and second wheel drive 1300 can be driven by a single electric or fossil fuel powered motor and/or engine. First wheel drive 1200 can be controllably rotatable at a first drive speed. Second wheel drive 1300 can be controllably rotatable at a second drive speed. The first drive speed can be distinct and/or different from the second drive speed.

First motor 1250 and/or second motor 1350 can be electric motors powered by an alternating current (AC) and/or electric motors powered by a direct current (DC). First motor 1250 and/or second motor 1350 can be an induction motor. The speed of first motor 1250 and/or second motor 1350 can be controlled via an AC inverter frequency controller, and/or a silicon controlled rectifier (SCR) speed control circuit, etc. The first drive speed and/or the second drive speed can be controllable via a braking system. First electric motor 1250 and/or second electric motor 1350 can generate electricity when a motion of a machine and/or vehicle is being retarded via controlling the speed of first electric motor 1250 and/or second electric motor 1350.

Energy management system 1000 can comprise an electrical bus 1400. Electrical bus 1400 can be electrically coupled to first motor 1250 and/or second motor 1350. Electrical bus 1400 can be adapted to electrically conduct electrical energy from first motor 1250 and/or second motor 1350 to a circuit 1500 adapted to dissipate electrical energy. Circuit 1500 can comprise DC Bus plus Filter capacitors. Circuit 1500 can comprise an SCR or another type of power switching device. Circuit 1500 can be adapted to transfer the electrical energy to a mass associated with vehicle 1100 via Hall Effect.

Figure 2:
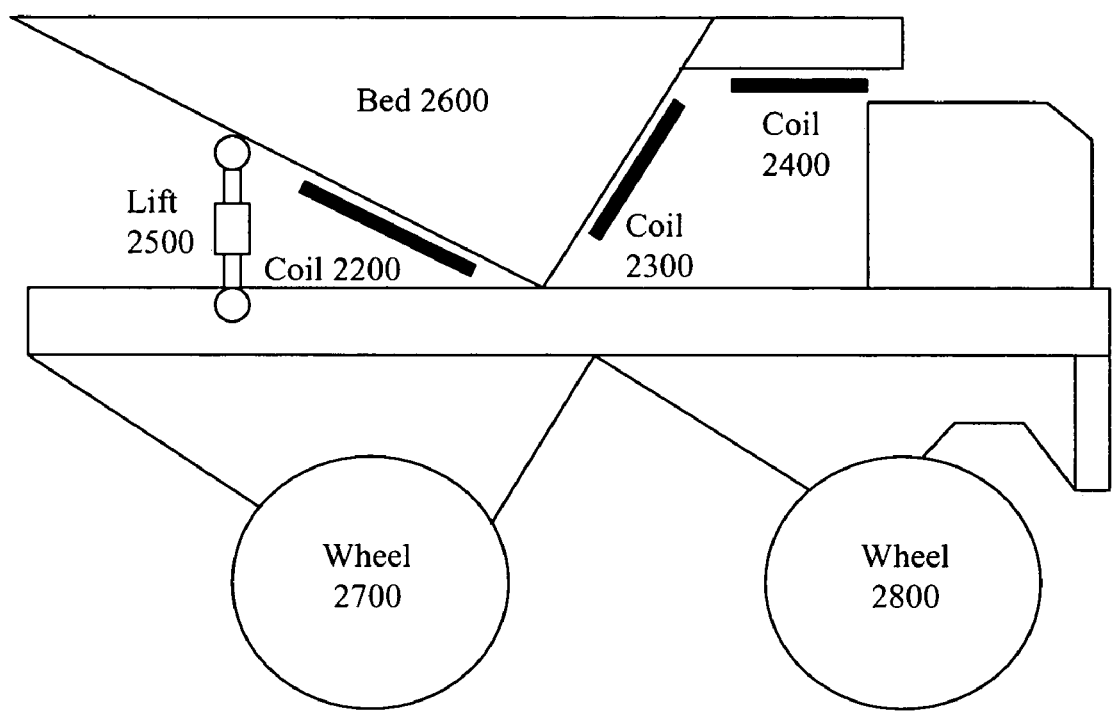
FIG. 2 is a block diagram of an exemplary embodiment of a machine comprising an energy dissipation system 2000.

FIG. 2 is a block diagram of an exemplary embodiment of a machine 2000 comprising an exemplary embodiment of an energy dissipation system as described with respect to FIG. 1. In certain exemplary embodiments, machine 2000 can be a mine haul truck. Machine 2000 can comprise a lift 2500 adapted to discharge material, such as mined ore, held in a bed 2600.

Machine 2000 can comprise a first wheel 2700 and a second wheel 2800. First wheel 2700 and/or second wheel 2800 can be driven by an electric motor. The electric motor can be slowed via electric braking. Electric breaking can convert rolling and/or dynamic mechanical energy of machine 2000 to an electrical current.

Machine 2000 can comprise a working coil 2200, 2300, and/or 2400. Working coil 2200, 2300, and/or 2400 can be placed at predetermined locations of a machine such as adjacent to bed 2600 of machine 2000. Bed 2600 can comprise a substantial mass. Placing working coil 2200, 2300, and/or 2400 adjacent to a mass associated with machine 2000 can facilitate the dissipation of energy created, for example, via electric braking of machine 2000.

Dissipating energy using working coil 2200, 2300, and/or 2400 can increase the local and/or average temperature of, for example, bed 2600. Increasing the temperature of bed 2600 of machine 2000 can improve material discharge from bed 2600. That is, in certain circumstances, warming the material in bed 2600 can allow the material to more easily slide out of bed 2600 when tipped by lift 2500.

Working coil 2200, 2300, and/or 2400 can be designed to dissipate a maximum electrical load without heating bed 2600 to a temperature high enough, for example, to change a metallurgical grain structure of bed 2600, degrade the material contained in bed 2600, or otherwise create a problem with the material or bed 2600. Thus, bed 2600 and/or the material contained therein can be maintained within a predetermined temperature range, above a predetermined minimum temperature, and/or below a predetermined maximum temperature.

Heat transfer from surfaces dissipating heat from working coil 2200, 2300, and/or 2400, such as certain surfaces of bed 2600, can occur via conduction, convection and/or radiation. Heat transfer from surfaces dissipating heat from working coil 2200, 2300, and/or 2400 can be enhanced via the addition, for example, of a heat exchange apparatus, such as a fan, fin, heat exchanger, tubular heat exchanger, and/or finned tube heat exchanger, etc.

Figure 3:
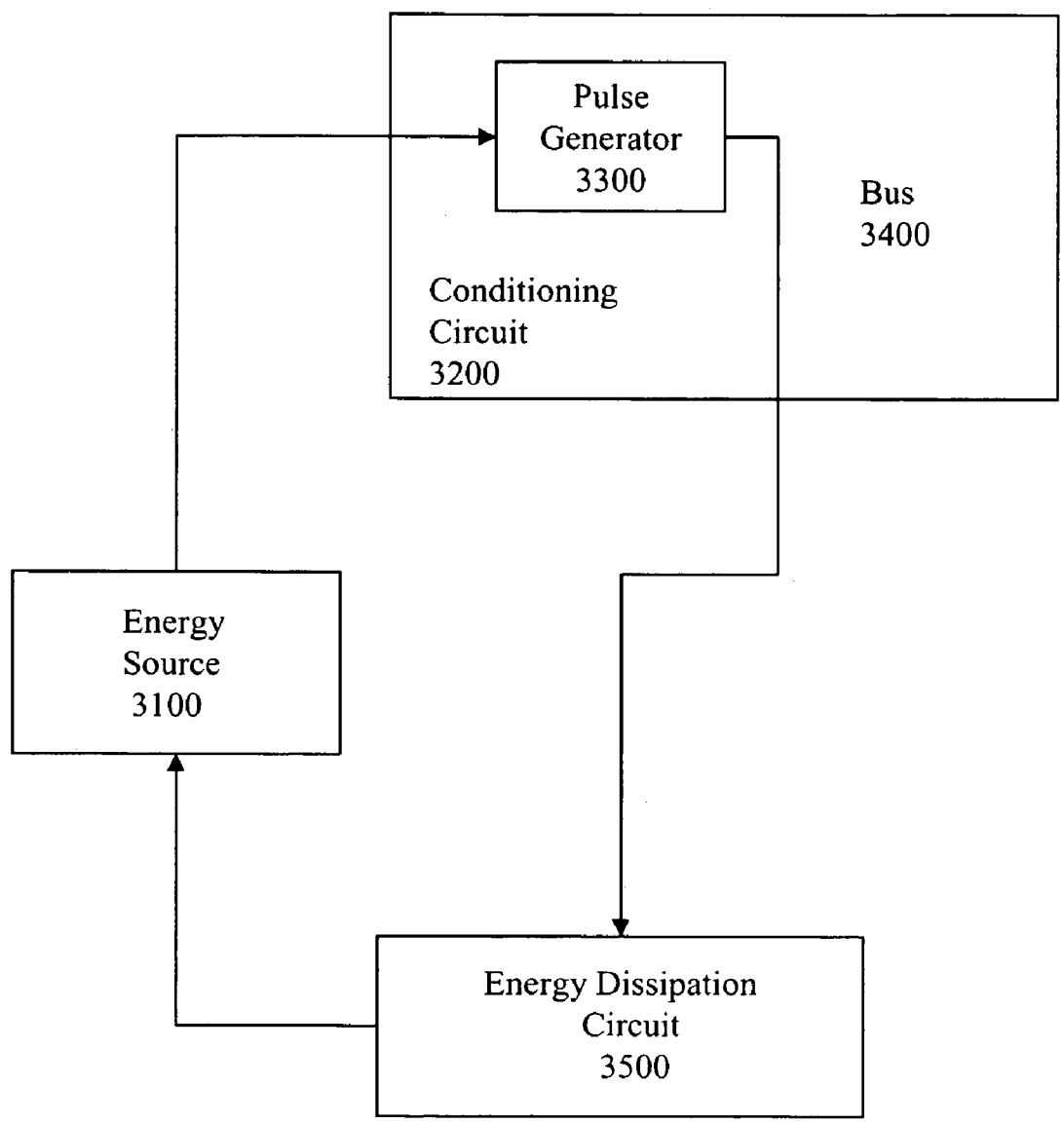
FIG. 3 is a block diagram of an exemplary embodiment of an energy management circuit 3000.

FIG. 3 is a block diagram of an exemplary embodiment of an energy management circuit 3000. Energy management circuit 3000 can comprise an energy source 3100. Energy source 3100 can be associated with a machine and/or vehicle such as an electric braking system. For example, energy source 3400 can comprise electrical bus 1400, first electric motor 1250, and/or second electric motor 1350 of vehicle 1100 in FIG. 1. Energy management circuit 3000 can comprise a conditioning circuit 3200. Conditioning circuit 3200 can comprise an AC inverter frequency controller, and/or a silicon controlled rectifier speed control circuit. Conditioning circuit 3200 can comprise a rectifying circuit in embodiments generating alternating current energy for dissipation. Conditioning circuit 3200 can comprise a pulse generator 3300 adapted to provide energy pulses to an energy dissipation circuit 3500. Pulse generator 3300 can be electrically coupled to an electrical bus 3400. Electrical bus 3400 can be adapted to electrically couple conditioning circuit 3100 to energy dissipation circuit 3500.

Energy dissipation circuit 3500 can comprise a tuned circuit. Energy dissipation circuit 3500 can be adapted to transfer energy from energy source 3100 via Hall Effect to a mass associated with the machine and/or vehicle, thereby inducing an electrical current in the mass. An inherent electrical resistivity of the mass can convert the electrical current to heat energy. Heat energy can be dissipated from the mass to a surrounding environment.

Figure 4:
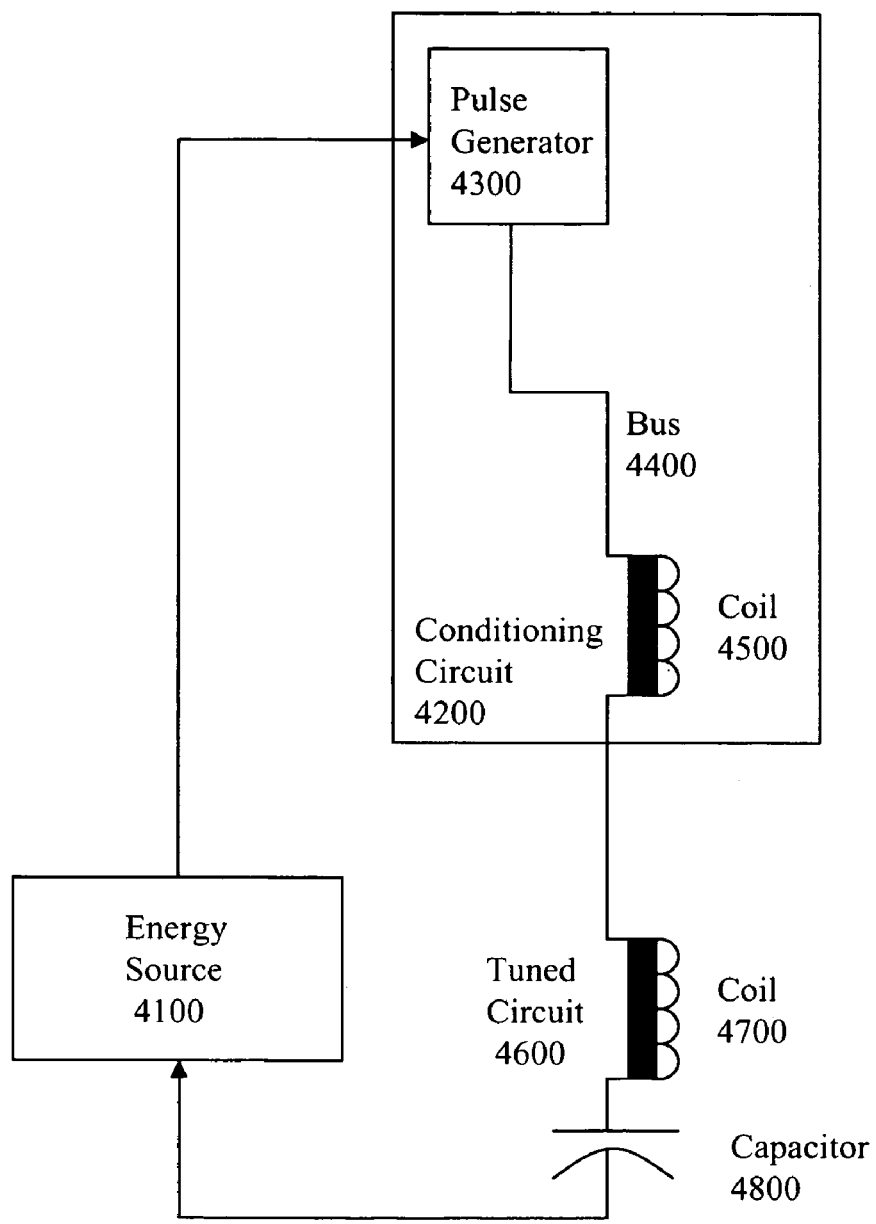
FIG. 4 is a block diagram of an exemplary embodiment of an energy management circuit 4000.

FIG. 4 is a block diagram of an exemplary embodiment of an energy management circuit 4000. Energy management circuit 4000 can comprise an energy source 4100 associated with a machine and/or vehicle. Energy management circuit 4000 can comprise a conditioning circuit 4200. Conditioning circuit 4200 can comprise a pulse generator 4300 adapted to provide electrical pulses from an electrical bus 4400 to a series circuit 4600.

In certain exemplary embodiments, charging coil 4500 can be adapted to smooth pulses obtained from pulse generator 4300. Parameters of charging coil 4500 can be selected to provide a desired level of smoothing of the pulses.

Energy management circuit 4000 can comprise a series circuit 4600, which can comprise a capacitor 4800 and a working coil 4700 electrically coupled in series. In certain exemplary embodiments, pulses obtained from pulse generator 4300 can be provided to series circuit 4600 at a frequency near, other than, and/or approaching, but not matching, a resonant frequency of series circuit 4600.

Capacitor 4800 can be electrically coupled to energy source 4100. Capacitor 4800 can be adapted to cyclically charge and discharge responsive to variations in voltage in energy management circuit 4000, such as variations caused by the pulsed nature of the voltage supplied by conditioning circuit 4200. Working coil 4700 can be adapted to transfer energy from energy management circuit 4000 via Hall Effect to a mass associated with the machine and/or vehicle.

Figure 5:
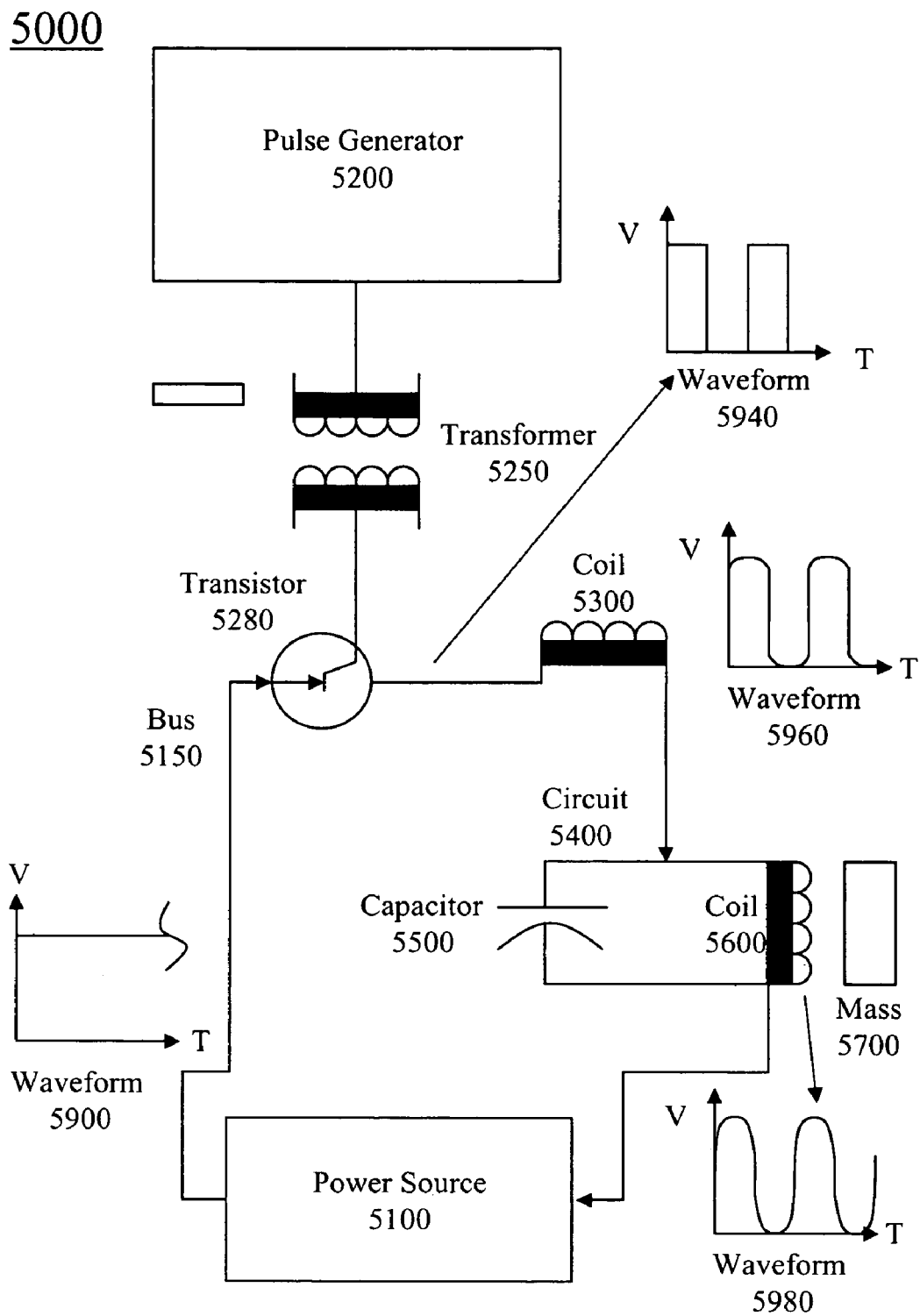
FIG. 5 is a block diagram of an exemplary embodiment of an energy management circuit 5000.

FIG. 5 is a block diagram of an exemplary embodiment of an energy management circuit 5000. Energy management circuit 5000 can comprise a power source 5100. Power source 5100 can comprise an energy source associated with a machine and/or vehicle. For example, power source 5100 can comprise electrical bus 1400, first electric motor 1250, and/or second electric motor 1350 of vehicle 1100 in FIG. 1. Power source 5100 can supply a voltage having a waveform 5900, which can be characterized as a substantially constant Direct Current having a substantially constant voltage.

Energy management circuit 5000 can comprise an electrical bus 5150. Energy management circuit 5000 can comprise a pulse generator 5200 adapted to convert direct current electrical energy to a pulsed current. Pulse generator 5200 can be electromagnetically coupled to a transistor 5280 via a transformer 5250.

Transistor 5280 can be adapted to provide electrical pulses from electrical bus 5150 to a tuned circuit 5400. Electrical current can be passed through transistor 5280 responsive to the frequency of the pulses provided by transformer 5250. Transistor 5280 can be electrically coupled to an electrical bus 5150. Transistor 5280 can introduce a pulse of waveform 5900 to coil 5300 and the components "downstream" on coil 5300. By pulsing waveform 5900, slight variations can be introduced in an otherwise substantially constant voltage on bus 5150. The pulsing of waveform 5900 can introduce a waveform 5940 between transistor 5280 and coil 5300, which can be characterized as a substantially rectangular Direct Current voltage periodically and/or predictably transitioning between approximately zero volts and approximately the voltage output from, and/or voltage differential across, power source 5100.

Charging coil 5300 can be adapted to smooth pulsed electrical waveforms. Coil 5300 can provide a waveform 5960, which can be characterized as a smoothed rectangular Direct Current voltage periodically and/or predictably transitioning between approximately zero volts and approximately the voltage output from power source 5100.

Tuned circuit 5400 can comprise a capacitor 5500 and a working coil 5600. Capacitor 5500 can be electrically coupled to working coil 5600 in series or parallel. Capacitor 5500 can be adapted to cyclically charge and discharge responsive to variations in voltage in energy dissipation circuit 5000. Responsive to input pulses, tuned circuit 5400 can produce a waveform 5980, which can be characterized as an approximately symmetrical alternating current voltage.

Working coil 5600 can be adapted to transfer energy from energy dissipation circuit 5000 via Hall Effect to a mass 5700, which can be related to, attached to, a component of, and/or integral to, the machine and/or vehicle. Working coil 5600 can induce an electrical current in mass 5700. The electrical current in mass 5700 can be induced as eddy currents. Mass 5700 can be a ferrous material and/or a nonferrous material, such as aluminum, copper, or any other electrically conductive material. The electrical current can penetrate mass 5700 to a desired and/or predeterminable penetration depth. The predeterminable penetration depth can be a function of an electrical frequency. The amount of electrical energy dissipatable by mass 5700 can be limited by the melting point of mass 5700, and/or a lower temperature limitation. For example, if mass 5700 is made of steel, the forging power of 500 kW/s/lb acts as a potential upper limit for dissipatable energy transfer.

In certain exemplary embodiments, a mine haul truck might require approximately 4 MW of power dissipation over about 20 minutes under a retarding condition. The penetration depth can be inversely proportional to a square root of the frequency and the magnetic permeability of mass 5700. Thus, a higher frequency can result in a lower penetration depth. For example, an approximately 1000 Hz electrical frequency can result in a penetration depth (if mass 5700 is steel) of approximately 0.1 inch. A relatively low penetration depth can improve convective and/or radiation heat transfer from a surface of mass 5700. A deeper penetration depth can improve conductive heat transfer from a surface of mass 5700.

Figure 6:
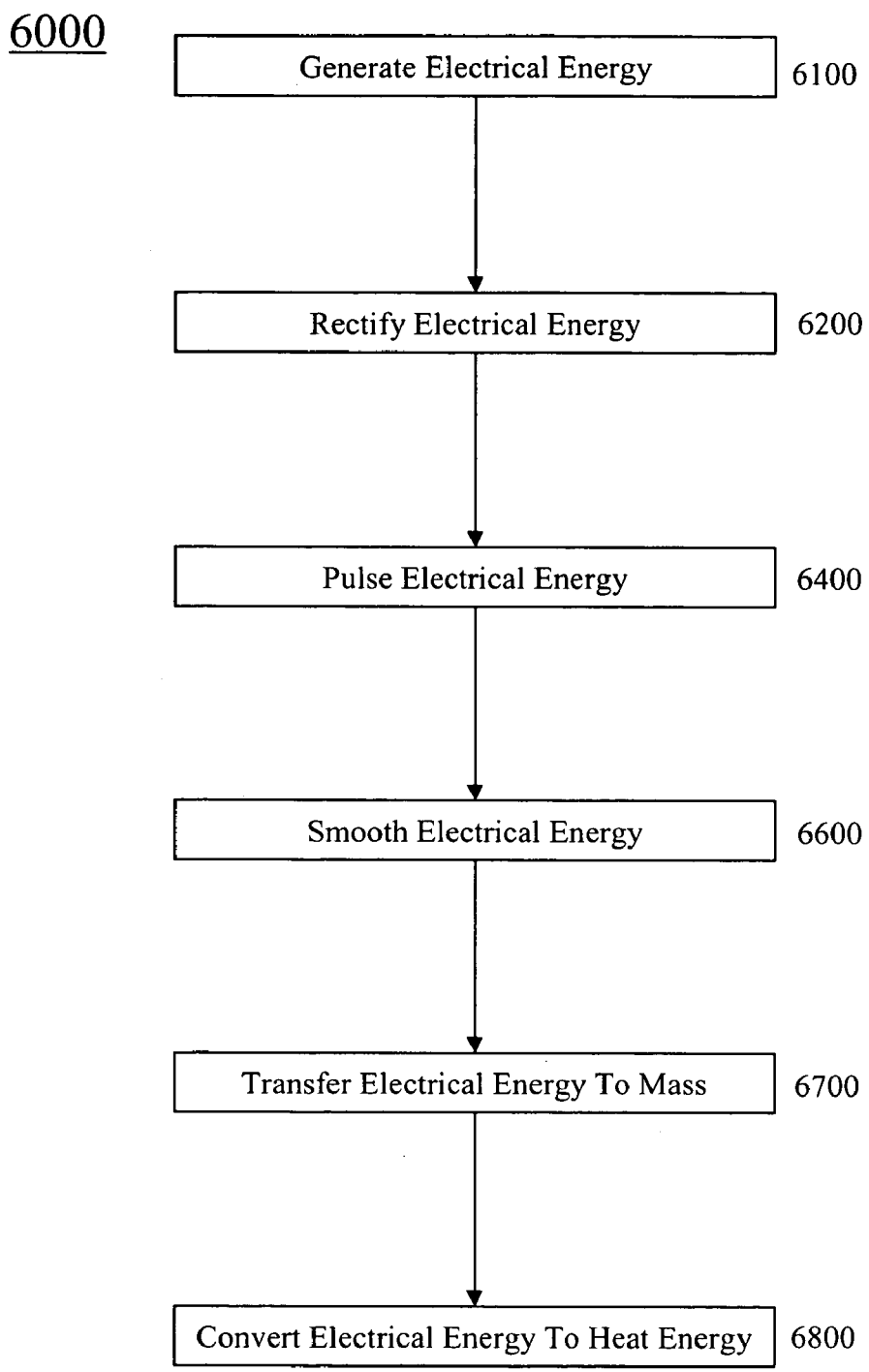
FIG. 6 is a flow diagram of an exemplary embodiment of an energy dissipation method 6000.

FIG. 6 is a flow diagram of an exemplary embodiment of an energy dissipation method 6000. At activity 6100, electrical energy can be generated, such as via an electrical braking system associated with a vehicle. The electrical energy can be associated with braking or retarding movement of the vehicle. The electrical energy can be generated as alternating current or as direct current.

At activity 6200, if desired, electrical energy provided as alternating current can be rectified to direct current, which, in certain embodiments, can be easier to manage downstream.

At activity 6400, the electrical energy can be provided to a downstream tuned circuit as a periodic and/or pulsed voltage waveform via, for example, a transistor, a chopper circuit, an inverter circuit, a single phase bridge circuit, and/or a three phase bridge circuit, etc. The periodic and/or pulsed voltage waveform can be generated at a magnitude, duration, shape, frequency, and/or phase adapted to the size, material(s), parameters, and/or configuration of a working coil, tuned circuit, and/or mass associated with the vehicle to which the energy will be transferred for dissipation.

At activity 6600, prior to being received by the tuned circuit, the electrical energy can be smoothed, such as via, for example, a charging coil, which can be adapted to smooth voltage waveform changes. Smoothing a voltage waveform can improve operation of the tuned circuit and/or a transfer of the electrical energy to the mass associated with the vehicle.

At activity 6700, electrical energy can be transferred to the mass associated with the vehicle. The mass can be an electrically and magnetically conductive material, such as cast iron, steel, copper, and/or aluminum, etc. The energy can be transferred via Hall Effect wherein a working coil that receives the electrical energy can electromagnetically induce an electrical current in the mass. The electrical current induced in the mass can penetrate to a depth related to the frequency of the pulse and the size of the working coil. Certain exemplary embodiments can utilize an electrical pulse frequency between about 400 Hz and about 10,000 Hz, including all values and subranges therebetween. The flow of electrical energy to the working coil can be affected by the impact of a capacitor that is either in series or parallel with the working coil.

At activity 6800, the energy transferred to the mass can be converted to heat energy. That is, an electrical resistance of the mass can transform the electrical energy to heat energy. The mass can dissipate the heat energy to a surrounding environment via, for example, convective heat transfer to air surrounding the vehicle and/or conductive heat transfer to substances in contact with the mass.

In certain exemplary embodiments, a pulse frequency can be selected based upon material properties of the mass associated with the vehicle. For example, for a steel mass the frequency can be selected at 1000 Hz. The capacitor and working coil can be selected to satisfy the formula:

Frequency=$(1/(2*\Pi))*$(square root $(1/(L*C))$), where L is the inductance of the working coil, and C is the capacitance of the capacitor.

In certain exemplary embodiments, the charging coil can have an inductance of approximately $\frac{1}{10}$ of the inductance of the working coil.

Figure 7:
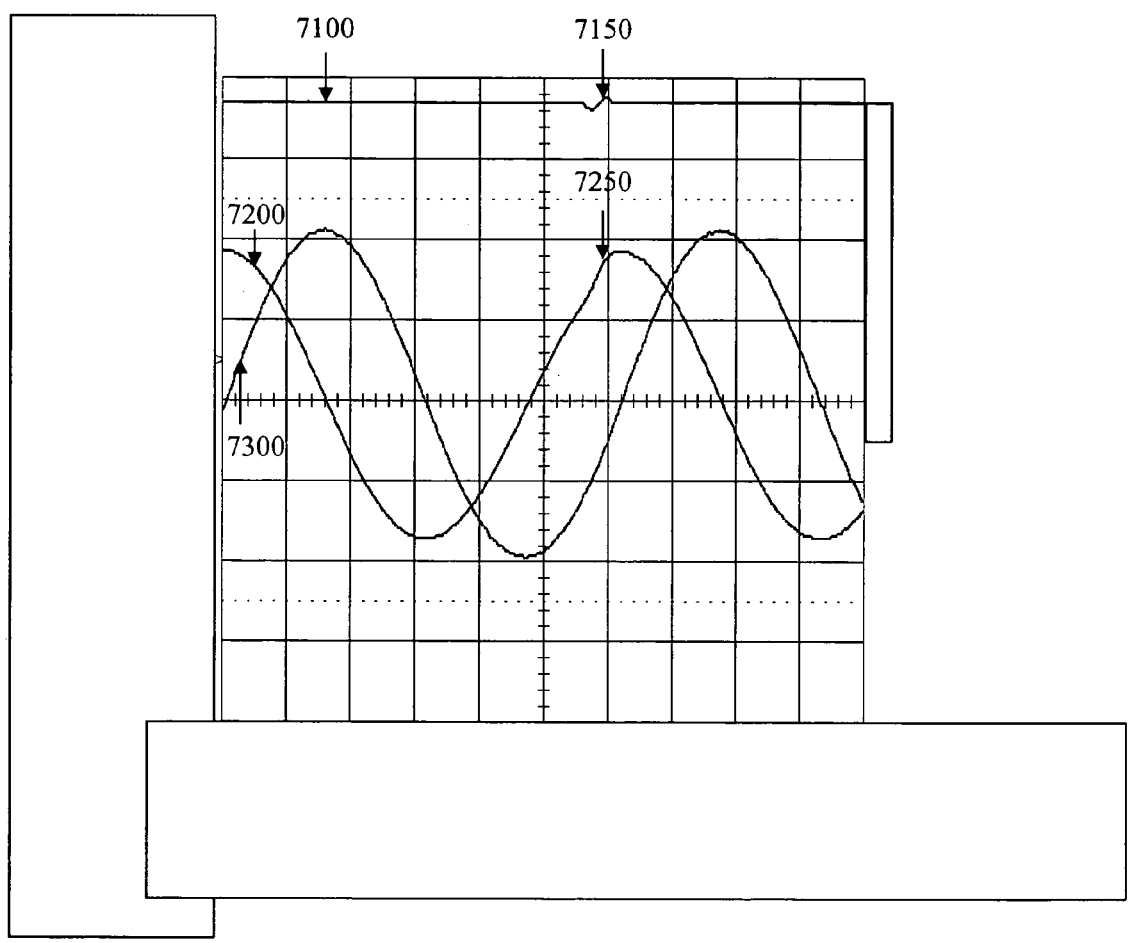
FIG. 7 is an oscilloscope output 7000 related to an experimental embodiment of a tuned circuit.

FIG. 7 is an oscilloscope output 7000 related an experimental embodiment of a tuned circuit not electromagnetically coupled to a mass. For this experiment, the tuned circuit comprised a 250 microfarad capacitor and a 160 microhenry working coil. The tuned circuit resonant frequency was approximately 800 Hz. To keep the tuned circuit operating at resonance, a voltage pulse was periodically applied at approximately the resonant frequency. The pulse was provided via a charging coil fed from a DC bus, the connection to which was switched by a transistor triggered by a pulse generator.

On oscilloscope output 7000, the DC bus voltage is shown as a waveform 7100, and illustrates the effect of the pulse on that bus voltage as a bus voltage blip 7150. The pulses excited the tuned circuit to create an oscillating voltage waveform 7200 and a lagging oscillating current waveform 7300. As indicated by bus voltage blip 7150, the pulse was applied as waveform 7300 approached a peak 7250. Application of the pulse helped to keep the tuned circuit operating at resonance. Various pulse parameters, e.g., magnitude, duration, frequency, shape, and/or phase, etc., can be adjusted as desired to create different effects upon waveforms 7200 and/or 7300.

For this experiment, the value of DC bus voltage was approximately 81.6 volts, and the tuned circuit current was approximately 3.1 amps. Thus, the tuned circuit had an impedance of approximately 26.4 ohms resulting in a dissipated power of approximately 250 watts.

Figure 8:
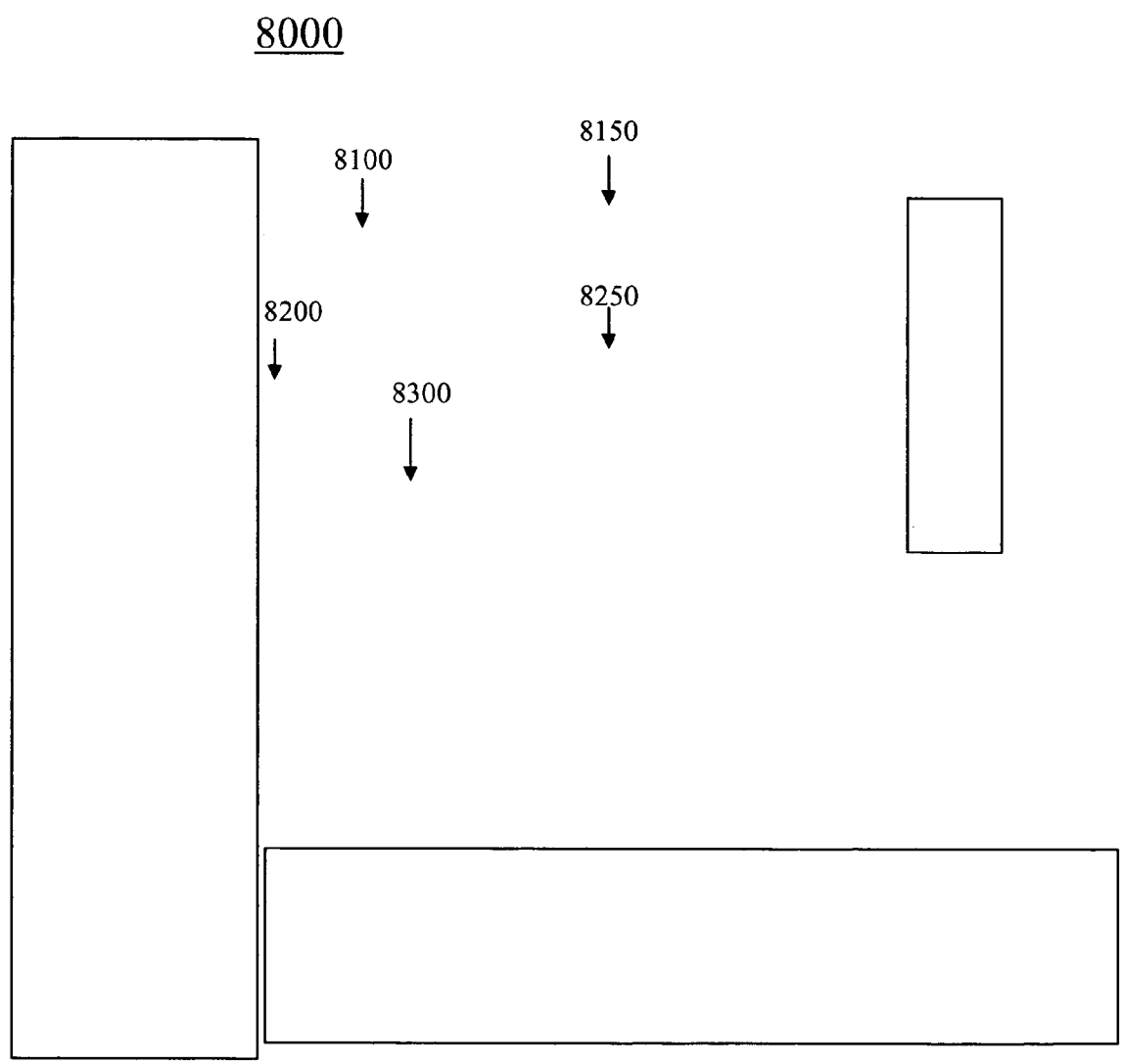
FIG. 8 is an oscilloscope output 8000 related to an experimental embodiment of a tuned circuit.

FIG. 8 is an oscilloscope output 8000 for an experimental embodiment of a tuned circuit electromagnetically coupled to a mass. For this experiment, the tuned circuit comprised a 250 microfarad capacitor and a 160 microhenry working coil having a diameter of roughly one foot. The resonant frequency of the tuned circuit was approximately 800 Hz. To keep the tuned circuit operating at resonance, a voltage pulse was periodically applied at approximately the resonant frequency. The pulse was provided via a charging coil fed from a DC bus, the connection to which was switched by a transistor triggered by a pulse generator. The mass was a steel pipe approximately 30 cm long, having an outer diameter of approximately 9 cm, with a wall thickness of approximately 0.3 cm, and weighing approximately 1.95 kg. A temperature rise in the mass was estimated using the formula:

$$\Delta T = Q/(M*H_m)$$

where $\Delta T$ is the temperature rise in degrees Celsius (° C.), Q is the energy dissipated in the mass in kilojoules per second (kJ/sec), M is the mass of the mass in kilograms (kg), and $H_m$ is the specific heat of the mass (0.5 kJ/kg ° C. for the steel pipe of this experiment). A time period of 60 seconds was used as a calculation basis. For this experiment Q was designed to be approximately 1000 watts or 1 kJ/sec. Thus, for this experiment, the calculated and/or predicted rise in temperature was:

$$\Delta T = (1 \text{ kJ/sec}*60 \text{ sec})/(1.95 \text{ kg}*0.5 \text{ kJ/kg °C.}) = 62° \text{ C.}$$

The experiment included temperature monitoring of the pipe to compare the predicted temperature rise to an actual temperature rise in the pipe. The results are reported in Table 1:

TABLE 1

| Time-Min | Temp | Delta Temp | Vdc | Idc | Watts |
| --- | --- | --- | --- | --- | --- |
| 0 | 25 | 0 | 81 | 3.4 | 275.4 |
| 1 | 73 | 48 | 81 | 15.6 | 1263.6 |
| 2 | 120 | 47 | 73 | 17 | 1241.0 |

The actual measurements indicated a temperature rise slightly below that predicted according to the formula. Although not intending to be limited by any particular theory or hypothesis, this difference was possibly due to convective air cooling of the pipe during the experiment.

Certain exemplary embodiments can use calculations to predict a temperature rise in, for example, a mine haul truck bed.

On oscilloscope output 8000, the DC bus voltage is shown as a waveform 8100. The pulses excited the tuned circuit to create an oscillating voltage waveform 8200 and a lagging oscillating current waveform 8300. As indicated by a bus voltage blip 8150, the pulse was applied as waveform 8300 approached a peak 8250.

For this experiment, the average value of DC bus voltage was approximately 81.6 volts, and the tuned circuit current was approximately 15.4 amps. Thus, the tuned circuit had an impedance of approximately 5.3 ohms resulting in a dissipated power of approximately 1256 watts.

Consequently, the experiments illustrated in FIGS. 7 and 8 illustrate that approximately 1000 watts was dissipated from the tuned circuit via inductive coupling into the mass.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. An electrical energy dissipation system for dissipating electrical energy from a braking system of a vehicle, the electrical energy dissipation system comprising:
    a tuned circuit electrically coupled to an electrical bus associated with the vehicle, the tuned circuit adapted to receive electrical energy from the braking system of the vehicle, the tuned circuit comprising;
        a capacitor; and
        a working coil coupled with said capacitor, said working coil adapted to transfer, via Hall Effect, the electrical energy from the braking system to a mass related to the vehicle, the transferred electrical energy convened to heat energy in the mass; and
    a pulse generator electrically coupled to an electrical bus, said pulse generator adapted to provide pulses to said tuned circuit at a frequency approximately equal to a resonant frequency of said tuned circuit.

2. The system of claim 1, wherein:
    said pulse generator powered by an alternating current source.

3. The system of claim 1, further comprising:
    a charging inductor electrically coupled in series with the electrical bus associated with the vehicle.

4. The system of claim 1, further comprising:
    the electrical bus coupled to said tuned circuit.

5. The system of claim 1, further comprising:
    the vehicle coupled to the electrical bus coupled to said tuned circuit.

6. The system of claim 1, wherein the vehicle is a truck.

7. The system of claim 1, wherein the vehicle is a mine haul truck.

8. The system of claim 1, wherein the first electrical motor is an electrical induction motor adapted to be powered by an alternating current.

9. The system of claim 1, wherein the first electrical motor is adapted to be powered by a direct current.

10. The system of claim 1, wherein the mass is a bed of a truck.

11. The system of claim 1, wherein the vehicle is a locomotive.

12. The system of claim 1, further comprising:
    a fan adapted to increase convective heat transfer from the mass.

13. The system of claim 1, further comprising:
    a heat exchange apparatus adapted to increase heat dissipation from the mass.

14. A system comprising:
    a means for receiving electrical energy from a braking system of a vehicle at a working coil;
    a means for transferring the electrical energy via Hall Effect to a mass related to a vehicle, the transferred electrical energy converted to heat energy in the mass; and
    a pulse generator electrically coupled to said means for receiving electrical energy, said pulse generator adapted to provide pulses to said means for transferring the electrical energy at a frequency approximately equal to a resonant frequency of said tuned circuit.

15. The system of claim 1, wherein the vehicle comprises a first wheel drive comprising a first electrical motor, the vehicle comprising a second wheel drive comprising a second electrical motor distinct from the first electrical motor.

16. A method comprising:
    receiving electrical energy from a braking system of a vehicle at a working coil, the vehicle comprising a first wheel drive comprising a first electric motor;
    via the working coil, transferring the electrical energy to a mass related to the vehicle via Hall Effect, the transferred electrical energy convened to heat energy in the mass; and via a pulse generator electrically coupled to an electrical bus, providing pulses to said tuned circuit at a frequency approximately equal to a resonant frequency of said tuned circuit.

17. The method of claim 16, further comprising:
generating the electrical energy via magnetically slowing the first electric motor.

18. The method of claim 16, further comprising:
rectifying the electrical energy from the first electric motor and the second electric motor to a direct current electrical energy.

19. The method of claim 16, further comprising:
converting the electrical energy to a time-series of voltage pulses.

20. The method of claim 16, wherein the vehicle comprises a first wheel drive comprising a first electrical motor, the vehicle comprising a second wheel drive comprising a second electrical motor distinct from the first electrical motor.

* * * * *